United States Patent [19]

Graves

[11] Patent Number: 4,562,170

[45] Date of Patent: Dec. 31, 1985

[54] POLYMERIZATION CATALYST

[75] Inventor: Victoria Graves, Crosby, Tex.

[73] Assignee: Exxon Research & Engineering Co., Florham Park, N.J.

[21] Appl. No.: 647,322

[22] Filed: Sep. 4, 1984

[51] Int. Cl.$^4$ ................................................ C08F 4/64
[52] U.S. Cl. .................................. 502/113; 502/104; 526/114
[58] Field of Search ................................ 502/113, 104

[56] References Cited

U.S. PATENT DOCUMENTS

| | | | |
|---|---|---|---|
| 3,135,809 | 6/1964 | Bosmajian | 502/114 X |
| 3,734,899 | 5/1973 | Fodor | 502/113 X |
| 3,812,089 | 5/1974 | Tashiro et al. | 502/113 X |
| 4,226,965 | 10/1980 | Grigoriev et al. | 502/113 X |
| 4,471,066 | 9/1984 | Sakurai et al. | 502/113 |

*Primary Examiner*—Patrick P. Garvin
*Attorney, Agent, or Firm*—Myron B. Kurtzman

[57] ABSTRACT

An olefin polymerization catalyst produced by treating a inert porous support material preferably a hydrated high surface area silica support having 1.00 to 1.50 hydroxyls per gram of silica with the reaction product of an organomagnesium compound and first a hafnium compound then a halogenator and tetravalent titanium compound, which when used as a cocatalyst with an organoaluminum compound produces polymers having broad molecular weight distribution.

20 Claims, No Drawings

POLYMERIZATION CATALYST

BACKGROUND OF THE INVENTION

1. Field of the Invention

The present invention relates to a catalyst for use in the polymerization of alpha-olefins such as ethylene to obtain a wide molecular weight distribution in the resultant polymers and to the process of polymerizing alpha-olefins using the catalyst.

2. Related Art

It is well known that the alpha-olefins such as ethylene can be polymerized by contacting them under polymerization conditions with "Ziegler" type catalyst, i.e., a catalyst obtained by activating a Group 4b or 5b transition metal-containing catalyst component with a cocatalyst, e.g., a titanium compound activated with an organometallic compound. It is also well known that this type of catalyst produces polymer with a narrow molecular weight distribution. For many applications it is necessary and desirable to improve the toughness of the processed polymer. One method of improving toughness properties is by preparing polymers of high molecular weight (low melt index). However, at the higher molecular weights there is a corresponding and detrimental decrease in the rheological properties of the polymer. This is compensated for in practice by broadening the molecular weight distribution, which is typically obtained by using a chromium based catalyst system in place of the Ziegler type catalyst. However, in commercial operations where both types of polymer, i.e., broad and narrow molecular weight distribution, are produced the presence of both Ti based Ziegler type catalysts and chromium based catalysts are required, and operational problems may occur since each catalyst is a poison to the other. Hence it is highly desirable that "Ziegler" compatible catalysts suitable for producing broad molecular weight polymer be developed.

According to the present invention it has been found that titanium based catalysts containing hafnium in addition to titanium and prepared by a particular procedure for use as a Ziegler type catalyst component, provide a broader molecular weight distribution for polymer produced therewith and are fully compatible with other Ziegler type catalysts.

U.S. Pat. No. 4,325,835 to Hartshorn et al. discloses a component for an olefin polymerization catalyst which is the product of treating a particular support material with (a) an organomagnesium compound, (b) an aluminum compound e.g. ethyl aluminum dichloride, (c) an organometallic compound of general formula $R_mMX_p$ wherein M is a metal of Groups IA, IIA, IIB, IIIB, VA or VIA of a Periodic Table, R is a hydrocarbyl or substituted hydrocarbyl group, X is a singly charged anionic ligand or a monodentate neutral ligand, m is an integer up to the highest valency of the metal M and p is 0 or an integer up to 2 less than the valency of the metal M, e.g., zirconium tetrabenzyl, and (d) at least one transition metal compound of Groups IVA, VA or VIA, e.g., titanium tetrachloride.

U.S. Pat. No. 4,385,161 to Caunt et al. discloses a catalyst component for polymerization of olefin monomers which is a transition metal composition which is obtained by reacting together an inert particulate material, an organic magnesium compound, a halogen-containing compound such as carbon tetrachloride, silicon tetrachloride or boron trichloride and a specified transition metal compound such as $VOCl_3$, bis(n-butoxy) titanium dichloride or zirconium tetrabenzyl.

U.S. Pat. No. 4,396,533 to Johnstone discloses a supported Ziegler catalyst prepared by the following steps:

(A) heating together at a temperature in the range of 250° to 1100° C. a refractory oxide support material, such as silica, and one or more halogen-free metal derivatives which are hydrides and/or organic derivatives of the metal, such as titanium tetraisopropylate;

(B) reacting the product from (A) with one or more organometallic compounds having a general formula $MR^1_aQ_{b-a}$ wherein M is a metal atom, $R^1$ is a hydrocarbon group, Q is a halogen or an oxyhydrocarbyl group, b is a valency of M and a is an integer from 1 to b and wherein the metal atom M is aluminum, boron, lithium, zinc or magnesium such as triethyl aluminum; and (C) impregnating the solid product from step (B) with one or more halogen-containing transition metal compounds wherein the metal or metals comprise titanium and/or vanadium and/or zirconium such as a mixture of vanadium oxytrichloride and titanium tetrachloride.

U.S. Pat. No. 4,397,762 to Johnstone discloses a supported Ziegler catalyst prepared by the following steps, carried out under anhydrous conditions:

(A) reacting a hydroxyl groups-containing support material comprising magnesium silicate or silica and magnesia with one or more organometallic compounds having the general formula $MR^1_aQ_{b-a}$ wherein M is a metal which is aluminum, boron, lithium, zinc or magnesium, $R^1$ is a hydrocarbyl group, Q is a halogen or an oxyhydrocarbyl group, b is the valency of M and a is an integer from 1 to b;

(B) removing unreacted organometallic compound if any, from the produced solid material; and (C) impregnating the solid material obtained from step B with one or more halogen-containing transition metal compounds wherein the transition metal(s) comprise titanium, vanadium or zirconium.

European Patent Application No. 058,549 filed by Asaki Kasei Kogyo Kabushiki Karisha discloses a catalyst for polymerizing olefins comprising a solid catalyst component A a.hd an organometallic component B in which the component A is obtained by reacting an (1) organometallic compound and (2) a transition metal compound or mixture of compounds of Ti, V, Ti and V, and Ti and Zr in the presence of a (3) solid reaction product of (a) an organomagnesium compound and (b) a halide of B, Si, Ge, Sn, P, Sb, Bi, Zn or hydrogen chloride and optionally (c) a solid inorganic oxide.

Other references, e.g., U.S. Pat. Nos. 4,310,648, 4,356,111 and 4,399,053 issued to Shipley, et al. and U.S. Pat. No. 4,396,747 to Welch et al. disclose unsupported organomagnesium/Zn/Ti olefin polymerization catalyst, unlike the present composition which requires the use of a support material from a Group 2a, 3a, 4a, or 4b metal oxide such as, for example, dehydrated silica.

In a related, commonly assigned application of the same inventor, Ser. No. 626,172, filed June 29, 1984 it was disclosed that a titanium based catalyst containing zirconium in addition to titanium and supported on dehydrated silica, produces alpha-olefin polymers having broadened molecular weight distribution in Ziegler polymerizations. However, it has been found that as the amount of zirconium is increased, in order to obtain beneficially broader molecular weight distribution in the polymer, the hydrogen response of the catalyst is so substantially reduced, such that melt index (MI) of less than 0.003 is obtained.

It is an advantage of the present invention that a rather specific catalyst has been discovered, which demonstrates good hydrogen response, for the production of broad molecular weight (MWD>10) linear polymers of alpha-olefins, in particular high density polyethylene and linear low density polyethylene. In particular, the present catalyst differs, among other reasons, from that of U.S. Pat. No. 4,325,835 in that that patent requires at least one aluminum compound; from U.S. Pat. No. 4,385,166, U.S. Pat. No. 4,396,533 and U.S. Pat. No. 4,397,762, in that a very wide and diverse variety of support materials and reactive components are taught by the references, which in the specifics produce substantially different catalysts from the present invention; from EPA No. 0058549 in that the reference discloses that a solid organomagnesium compound is present prior to the introduction of transition metal compound, the use of only zirconium and vanadium as second transition metal components, and the use of an organometallic compound (1) of lithium, magnesium, aluminum or zinc as an additional catalyst component, whereas in the present catalyst preparation a hafnium compound reacts directly with the organomagnesium compound and the organometallic compound is not used.

The unsupported catalyst are less active than the present catalyst and polymers produced with such catalyst may require deashing of the polymer to remove excess metals or operation at very high ethylene partial pressure.

SUMMARY OF THE INVENTION

Briefly, one aspect of the present invention is a supported olefin polymerization catalyst prepared under anhydrous conditions by the steps of:

(a) preparing a slurry of inert particulate support material. Preferable support material is a Group 2a, 3a, 4a or 4b metal oxide and more preferably dehydrated high surface area silica preferably having from 1.00 to 1.50 millimoles OH$^-$/gram of silica;

(b) adding to said slurry a solution of an organomagnesium compound;

(c) adding to said slurry and reacting a solution of hafnium compound;

(d) adding to said slurry and reacting a halogenator;

(e) adding to said slurry and reacting a tetravalent titanium compound; and (f) recovering solid catalyst.

The resulting catalyst is maintained under anhydrous conditions and is used with an organoaluminum cocatalyst to polymerize alpha-olefins to produce low melt index polymers having a broad molecular weight distribution which is determined empirically from a ratio of melt index taken under two sets of conditions, i.e., HLMI/MI=MIR. Greater MIR's indicate a broad molecular weight distribution, although for different catalysts the MIR numbers do not indicate the same molecular weight distribution. Another measure of molecular weight distribution is the ratio of the weight average molecular weight (Mw) to the number average molecular weight (Mn). The ratio (Mw/Mn) is known as the polydispersity of the polymer and is readily obtained by size exclusion chromatography (i.e., gel permeation chromatography). The polymers produced in accordance with this invention will obtain Mw/Mn>10, and preferably 10–30 with an MI of about 0.05 to about 2.0.

It has been found that the order of addition of the first three components is essential to the ability of the catalyst to produce broad molecular weight distribution polymers. Although the order of the last two steps is not as significant, that set forth is preferred. Omission of the hafnium component produces an active catalyst, but the polymers have very narrow molecular weight distribution.

DETAILED DESCRIPTION OF THE INVENTION

Typically, the support can be any of the solid particulate porous supports such as silica, talc, zirconia, thoria, magnesia and titania. Preferably the support material is a Group 2a, 3a, 4a and 4b metal oxide in finely divided form.

Suitable inorganic oxide materials which are desirably employed in accordance with this invention include silica, alumina, and silica-alumina and mixtures thereof. Other inorganic oxides that may be employed either alone or in combination with the silica, alumina or silica-alumina are magnesia, titania, zirconia, and the like. Other suitable support materials, however, can be employed. For example, finely divided polyolefins such as finely divided polyethylene.

The metal oxides generally contain acidic surface hydroxyl groups which will react with the organometallic composition or transition metal compound first added to the reaction solvent. Prior to use, the inorganic oxide support is dehydrated, i.e., subject to a thermal treatment in order to remove water and reduce the concentration of the surface hydroxyl groups. The treatment is carried out in vacuous or while purging with a dry inert gas such as nitrogen at a temperature of about 100° to about 1000° C., and preferably from about 300° C. to about 800° C. Pressure considerations are not critical. The duration of the thermal treatment can be from about 1 to about 24 hours. However, shorter or longer times can be employed.

Suitable dehydrated silica preferably has a surface area of at least 20 m$^2$/g, preferably at least about 100 m$^2$/g and particle diameter of about 0.01 to 500 microns, preferably about 0.1 to 100 microns. The silica may be obtained by dehydrating silica gel by fluidizing in a stream of dry nitrogen for a period of about twenty hours at temperature sufficient to remove both adsorbed and chemically bound water, provided the resultant silica contains not less than 1.00 millimoles of OH$^-$/g of silica and preferably from 1.20 to 1.50 millimoles of OH$^-$/g of silica. It has been found that the benefit of broad molecular weight distribution is best obtained in this range. Generally the dehydrating temperature would be from 200° C. to 900° C., preferably about 300° C. to 500° C, and more preferably 450° C.

The organomagnesium compound include hydrocarbon soluble dihydrocarbylmagnesium wherein the hydrocarbyls have from 1 to 30 carbon atoms, such as dialkyl, diaryl, dialkaryl, diaralkyl, said alkyl including cyclic and acyclic radicals, preferably the magnesium dialkyls and the magnesium diaryls. Exemplary suitable magnesium dialkyls include particularly n-butyl-sec-butyl magnesium, diisopropyl magnesium, di-n-hexyl magnesium, isopropyl-n-butyl magnesium, ethyl-n-hexyl magnesium, ethyl-n-butyl magnesium, di-n-octyl magnesium and others wherein each alkyl has from 1 to 20 carbon atoms. Exemplary suitable magnesium diaryls include diphenylmagnesium, dibenzylmagnesium and ditolylmagnesium. Suitable organomagnesium compounds include alkyl and aryl magnesium alkoxides and aryloxides, and aryl and alkyl magnesium halides with the halogen-free organomagnesium compounds being more desirable.

The hafnium compound includes halides, alkoxyhalides, alkoxides and chelate compounds. Suitable hafnium compounds which can be employed herein include those represented by the empirical formula: $Hf(OR)_xX_y$, wherein each R is independently a hydrocarbyl group having from 1 to about 20, preferably 1 to about 10, carbon atoms, each X is independently a halogen atom, preferably chlorine or bromine, and x and y independently have values from zero to 4 with the value of x plus y being 4, such as hafnium tetrachloride, hafnium tetrabromide, ethoxytrichlorohafnium, diethoxydichlorohafnium, dibutoxydichlorohafnium, ethoxytrichlorohafnium, butoxytrichlorohafnium, tetraethoxyhafnium, tetrabutoxyhafnium, hafnium acetylacetonate, di(2-ethyl hexoxy) dichlorohafnium and any mixture thereof.

The halogenators include the chlorides, bromides and fluorides of Group 3a, 4a and 5a metals of the Periodic Table of elements (U.S. standard Periodic Table as shown on the back cover of Handbook of Chemistry and Physics, 45th Edition, The Chemical Rubber Co., 1964) more preferably B, Si, Ge, Sn, P, Sb and Bi and hydrogen halides such as HCl, HBr and HF.

The halides are the compounds having at least one halogen atom. Preferred halides are the chlorides. Exemplary halides include boron halides such as boron trichloride, diethylboron chloride, dibutylboron chloride, diphenylboron chloride, ethylboron dichloride, butylboron dichloride, phenylboron dichloride, ethoxyboron dichloride and boron tribromide; silicon halides such as methylchlorosilane, methyldichlorosilane, tetrachlorosilane, trichlorosilane, methyltrichlorosilane, dimethylchlorosilane, dimethyldichlorosilane, trimethylchlorosilane, ethyldichlorosilane, ethyltrichlorosilane, diethylchlorosilane, diethyldichlorosilane, triethylchlorosilane, vinyltrichlorosilane, vinyldichlorosilane, propyltrichlorosilane, propyldichlorosilane, allyltrichlorosilane, butyltrichlorosilane, butyldichlorosilane, isobutyltrichlorosilane, sec-butyltrichlorosilane, tert-butyltrichlorosilane, sym-tetramethyldichlorosilane, octyldichlorosilane, decyltrichlorosilane, decyldichlorosilane, pentachlorodisilmethylene, hexachlorodisilmethylene, hexachlorocyclotrisilmethylene, phenyltrichlorosilane, phenyldichlorosilane, benzyltrichlorosilane, ethoxytrichlorosilane, diethoxydichlorosilane, butoxydichlorosilane, octoxytrichlorosilane and tetrabromosilane; germanium halides such as tetrachlorogermanium, methyltrichlorogermanium, dimethyldichlorogermanium, trimethylchlorogermanium, ethyltrichlorogermanium, butyltrichlorogermanium and ethoxytrichlorogermanium; tin halides such as tin tetrachloride, methyltrichlorotin, diethyldichlorotin, dibutoxydibutyltin, trioctylchlorotin and tin tetrabromide; phosphorus halides such as phosphorus trichloride, phosphorus tribromide, phosphorus pentachloride, ethyldichlorophosphine and propyldichlorophosphine; antimony halides such as methyldichlorostibine, trimethylantimony dichloride and tripropylantimony dichloride and bismuth halides such as methyldichlorobismuthine; ethyldichlorobismuthine, butyldichlorobismuthine and dimethylchlorobismuthine. Of these compounds, chlorides of boron, tin, silicon or germanium are preferred in order to obtain polymers having a good particle size distribution and a high bulk density, and chlorides of boron are more preferred.

The tetravalent titanium compounds employed in this invention include halides, alkoxyhalides, alkoxides, siloxyhalides, siloxides, aromatic ring complexes and chelate compounds of titanium such as titanium tetrachloride, titanium tetrabromide, titanium tetraiodide, ethoxytitanium trichloride, propoxytitanium trichloride, butoxytitanium trichloride, octoxytitanium trichloride, diethoxytitanium dichloride, dipropoxytitanium dichloride, dibutoxytitanium dichloride, triethoxytitanium monochloride, tripropoxytitanium monochloride, tributoxytitanium monochloride, phenoxytitanium trichloride, benzoyltitanium trichloride, dicyclopentadienyltitanium dichloride, tetraisopropoxytitanium, tetrapropoxytitanium, tetrabutoxytitanium, bis(triphenylsiloxy)titanium dichloride, titanium acetylacetonate and any mixtures thereof.

Generally the silica comprises from 44 to 84 weight percent of the total catalyst composition, preferably about 48 to 54 weight percent.

The proportions of the foregoing components of the catalyst are such that the atomic ratios of the elements are:

Mg:Hf is from about 0.5:1 to about 14:1; preferably from about 1:1 to 10:1; more preferably 1.2:1 to 3.2:1.

Hf:Ti is from about 0.2:1 to about 10:1; preferably from about 0.5:1 to 8:1; more preferably 1:1 to 4:1.

The reaction to produce the present catalyst is carried out in the presence of an inert diluent. The concentrations of catalyst components are preferably such that when the essential components are combined, the resultant slurry is from about 0.0005 to about 1.0 molar (moles/liter) with respect to magnesium. By way of an example of suitable inert organic diluents can be mentioned liquefied ethane, propane, isobutane, n-butane, n-hexane, the various isomeric hexanes, isooctane, paraffinic mixtures of alkanes having from 8 to 12 carbon atoms, cyclohexane, methylcyclopentane, dimethylcyclohexane, dodecane, industrial solvents composed of saturated or aromatic hydrocarbons such as kerosene, naphthas, etc., especially when freed of any olefin compounds and other impurities, and especially those having boiling points in the range from about $-50°$ to 200° C. Also included as suitable inert diluents are benzene, toluene, ethylbenzene, cumene, decalin and the like.

Mixing of the catalyst components to provide the present catalyst is carried out under an inert atmosphere such as nitrogen, argon or other inert gas at temperatures in the range from about $-100°$ to about 200° C., preferably from about 0° to about 100° C. The period of mixing is not considered to be critical as it is found that a sufficient catalyst composition most often occurs within about 1 minute or less. In the preparation of the present catalyst, the catalysts should be washed to remove hydrocarbon soluble components from hydrocarbon insoluble components of the reaction product.

In a second aspect, the invention is a process for polymerizing at least one alpha-olefin under conditions characteristic of Ziegler polymerization wherein the catalyst of the present invention is employed as a cocatalyst with an organometallic compound containing aluminum. Preferred organoaluminum compounds have the empirical formula $AlR_{3-a}X_a$ wherein each R is independently hydrocarbyl as hereinbefore defined such as alkyl, X is a halogen and a is a number from 0 to 3. Suitable organoaluminum compound include trialkylaluminums such as $Al(C_2H_5)_3$, $Al(C_3H_7)_3$, $Al(C_4H_9)_3$, $Al(C_5H_{11})_3$, $Al(C_6H_{13})_3$, $Al(C_8H_{17})_3$ and $Al(C_{10}H_{21})_3$, alkylaluminum hydrides such as $Al(C_2H_5)_2H$ and $Al(i-C_4H_9)_2H$, alkylaluminum halides such as $Al(C_2H_5)_2Cl$, $Al(C_2H_5)Cl_2$, $Al(i-C_4H_9)_2Cl$ and $Al(C_2H_5)_2Br$, alkylaluminum alkoxides such as $Al(C_2H_5)_2(OC_2H_5)$ and $Al(i-C_4H_9)_2(OC_4H_9)$. The atomic ratio of Al:Ti may be in the range of 0.1:1 to 200:1, generally less than 50:1.

In the polymerization process employing the present catalyst, polymerization is effected by adding a catalytic amount of the above catalyst composition and organoaluminum cocatalyst (catalyst system) to a polymerization zone containing alpha-olefin monomer, or vice versa. The polymerization zone is maintained at temperatures in the range from about 0° to about 300° C., preferably at slurry polymerization temperatures, e.g., from about 75° to about 110° C. (about 130° to about 250° C. for solution polymerization), for a residence time of about a few seconds to several days, preferably 15 seconds to 2 hours. It is generally desirable to carry out the polymerization in the absence of moisture and oxygen with a catalytic amount of the present catalyst being within the range from about 0.0001 to about 0.1 millimoles titanium per liter of diluent. It is understood, however, that the most advantageous catalyst concentration will depend upon polymerization conditions such as temperature, pressure, diluent and presence of catalyst poisons, and that the foregoing range is given to obtain maximum catalyst yields in weight of polymer per unit weight of titanium. Generally the diluent is selected from paraffins and cycloparaffins having 3 to 30 carbon atoms. Suitable diluents include for example isobutane, isopentane, hexane, cyclohexane and the like.

The polymerization pressures preferably employed are relatively low, e.g., from about 50 to about 1000 psig, especially from about 100 to about 700 psig. However, polymerization within the scope of the present invention can occur at pressures from atmospheric up to pressures determined by the capabilities of the polymerization equipment. During polymerization it is desirable to stir the polymerization system to obtain better temperature control and to maintain uniform polymerization mixtures throughout the polymerization zone.

In order to optimize catalyst yields in the polymerization of ethylene, it is preferable to maintain the total system pressure in the range of 100 to 200 psig. To achieve this ethylene is fed on demand.

Hydrogen can be employed in the practice of this invention to lower the molecular weight of the resultant polymer. For the purpose of this invention, it is beneficial to employ hydrogen in concentrations ranging from about 0.001 to about 1 mole per mole of monomer. The larger amounts of hydrogen within this range are found to produce generally lower molecular weight polymers. It is understood that hydrogen can be added with a monomer stream to the polymerization vessel or separately added to the vessel before, during or after addition of the monomer to the polymerization vessel, but during or before the addition of the catalyst.

The catalysts of this invention are especially useful in gas phase polymerizations in which fluidization process is involved.

The monomer or mixture of monomers is contacted with the catalyst system in any conventional manner, preferably by bringing the present catalyst system and monomer together with intimate agitation provided by suitable stirring or other means. Agitation can be continued during polymerization, or in some instances, the polymerization mixture can be allowed to remain unstirred while the polymerization takes place. The polymerization can be effected in the batch manner, or in a continuous manner, such as, for example, by passing the reaction mixture through an elongated reaction tube which is contacted externally with suitable cooling medium to maintain the desired reaction temperature, or by passing the reaction mixture through an equilibrium overflow reactor or a series of the same.

The polymer is readily recovered from the polymerization mixture by driving off unreacted monomer and/or diluent. No further removal of impurities is required. The resultant polymer is found to contain insignificant amounts of catalyst residue and to possess a relatively broad molecular weight distribution.

The catalysts of this invention are useful for the polymerization of olefins and particularly useful for the polymerization of ethylene and higher alpha olefins (e.g., $C_3$–$C_8$). The advantages of this invention are especially obtained in the polymerization of ethylene to high density polyethylene (density about 0.940–0.960) and the polymerization of ethylene with higher olefins ($C_3$–$C_8$) and/or diolefins to obtain linear low density polyethylenes (density about 0.918–0.958). The preferred comonomers of ethylene are propylene, butene-1, pentene-1, 4-methyl pentene-1, hexene-1 and octene-1.

The invention will be more clearly understood by reference to the following examples. These examples illustrate specific embodiments of the present invention and should not be construed to limit the invention in any way.

CATALYST PREPARATION

Typical Silica Dehydration

The silica is dehydrated by fluidizing the solid particles in a stream of dry nitrogen gas in a tube placed in a vertical tube furnace. Adjust temperature to 150° C. inside the fluidized bed and hold for three hours to remove bulk $H_2O$. Raise the temperature to the desired level and hold for a minimum of twelve hours, preferably twenty hours. The furnace is then turned off and the silica allowed to cool while maintaining a flow of nitrogen. The number of residual hydroxyls can be determined by a weighed sample of the silica gel at 1000° C. for twenty two hours. The weight loss on ignition can be used to determine the weight (mmoles) of OH per gram of dehydrated silica.

In the following examples the Melt Index (MI) is ASTM D 1238, 2.16 grams, condition B. The High Load Melt Index (HLMI) is ASTM D 1238, 21.6 grams, condition F. The ratio of HLMI/MI (MIR) indicates the molecular weight distribution of the polymer, higher ratios indicate broad distribution.

EXAMPLE 1

Silica gel (3.23g, Davison 952, dehydrated at 400° C.) was charged to a 125 ml Wheaton vial and slurried in 30 ml dry, degassed heptane. To the vial was added 3.9 ml of a 0.68M heptane solution of butyl ethyl magnesium. The slurry was stirred at ambient conditions for 30 minutes. At the end of this period 5.9 ml of 0.28M solution of $Hf(OR)_2Cl_2$ (R=2-ethylhexyl) was added to the slurry. The vial contents were heated to 80° C. and stirred for 15 minutes. The heating was discontinued and the slurry allowed to cool below 40° C. at which point 2.7 ml of a 1M solution of $BCl_3$ in methylene chloride was added to the vial and the slurry agitated for an additional hour. Finally, 1 ml of a 1M heptane solution of TiCl$_4$ was charged to the flask and the slurry was heated to 80° C. and held at that temperature for 15 minutes. The slurry was then cooled to ambient temperature, the solid filtered and washed twice with dry hexane. The solid catalyst component was analyzed for metals content and found to contain the following: Mg 0.84 wt%, Hf 3.34 wt%, Ti 0.23 wt%.

POYLMERIZATION

Using the catalyst described, ethylene was polymerized in the following manner: to a 2.3 liter reactor was charged 860 ml hexane, 1.5 mmoles triisobutylaluminum, 2 mmoles 1,2-dichloroethane, 200 mg of the solid catalyst component and 200 mmoles H$_2$. The internal temperature was raised to 85° C. and sufficient ethylene was charged to the reactor to bring the total pressure to 150 psig. As the ethylene was consumed during the reaction, it was continuously replaced to maintain a total pressure of 150 psig. At the end of 40 minutes the heating and stirring were discontinued and the reactor vented down to atmospheric pressure. The recovered polyethylene weighed 111.6 g. The melt index of the polymer was 0.18 dg/min, the HLMI was 15.30 dg/min and the MIR was 66.0 indicating a broad molecular weight distribution. The untapped bulk density of the resin was 0.33 g/cc.

EXAMPLE 2

A sample of the catalyst was prepated exactly as in Example 1 except that no heat was supplied during the catalyst preparation. Metal anaylsis of the catalyst gave the following values: Mg 0.78 wt%, Hf 3.37 wt%, B 0.32 wt%, Ti 0.18 wt%.

POLYMERIZATION

The catalyst was tested for polymerization activity under the conditions listed above in Example 1. The polymer yield was 83.9 g. The resin MI was 0.13 dg/min, the HLMI was 9.66 dg/min and the MIR was 74.3. The untapped bulk density of the resin was 0.22 g/cc.

EXAMPLE 3

Silica gel (3 g, Crosfield SD 293, dehydrated at 700° C.) was charged to a 125 ml Wheaton vial and slurried in 40 ml dry degassed heptane. To the slurry was charged 5.4 mmoles of butyl ethyl magnesium and the slurry agitated for 30 minutes. At the end of this period, 0.6 mmoles Hf(OR)$_2$Cl$_2$ (R=2-ethyl hexyl) was charged to the vial. The slurry temperature was raised to 85° C. and held at this temperature for one hour. The slurry was allowed to cool to ambient temperature and 2.4 mmoles of BCl$_3$ was charged to the slurry. The contents of the flask were agitated for one hour and then 0.9 mmoles of TiCl$_4$ was charged to the vial. Stirring was continued for an additional hour. The catalytic solid was then washed four times with hexane and dried. 4.085 g solid catalyst was recovered. Metals analysis of the catalyst gave the following results: Mg 2.5 wt%, Hf 1.83 wt%, B 0.54 wt%, Ti 0.47 wt%.

POLYMERIZATION

Polymerization of ethylene was conducted under the same conditions as for Example 1, except that 150 ml of hexene was charged to the reactor after the hexane diluent to obtain a linear low density product. The copolymer yield was 25.1 g. The melt index of the polymer was 0.19 dg/min and the HLMI was 5.17 giving a MIR of 48. The density of the resin was 0.9354 g/cc.

EXAMPLE 4

Silica gel (3 g, Crosfield SD 293, dehydrated at 700° C.) was charged to a 125 ml vial in a dry box and slurried in 40 ml dry heptane. To the vial was charged 2.4 mmoles butyl ethyl magnesium which was stirred for 30 minutes. At the end of this time, 1.5 mmoles Hf(OR)$_2$Cl$_2$ (R=2-ethyl hexyl) was charged to the vial and the slurry temperature raised to 85° C. The slurry was agitated at this temperature for one hour. The slurry was then cooled to ambient temperature and 2.4 mmoles BCl$_3$ was added to the vial. The slurry was agitated at ambient temperature for 15 minutes. Then 1.5 mmoles TiCl$_4$ was added to the vial and the slurry heated at 85° C. for 15 minutes. The solid catalyst was washed four times with hexane and dried. 6.217 g of solid catalyst was recovered. Metals analysis of the catalyst gave the following results: Mg 0.9 wt%, Hf 3.21 wt%, B 0.34 wt%, Ti 0.43 wt%.

POLYMERIZATION

Copolymerization of ethylene and hexene was conducted exactly as in Example 3. The yield of copolymer was 68.8 g. The melt index of the polymer was 0.216 dg/min and the HLMI was 17.4 dg/min giving an MIR=80.4. The resin density was 0.9213 g/cc.

EXAMPLE 5

Silica gel (3 g. Davison SD 293, dehydrated at 500° C.) was charged to a 125 ml Wheaton vial in a dry box. To this was added 75 ml heptane and 2.4 mmoles butyl ethyl magnesium. The slurry was stirred for 30 minutes. At this point 1.5 mmoles Hf(OR)$_2$Cl$_2$ (R=2-ethyl hexyl) was charged to the vial and the slurry heated to 85° C. and held at this temperature for 15 minutes. After allowing the slurry to cool to ambient temperature, 2.4 mmoles BCl$_3$ was added to the vial and agitation continued for one hour. Finally, 0.9 mmoles TiCl$_4$ was added to the slurry and the internal temperature raised to 85° C. The temperature was held at this level for 15 minutes The catalytic solid was then washed four times with hexane and dried. 6.313 g of solid was recovered. Metals analysis of the solid gave the following results: Mg 1.07 wt%, Hf 5.39 wt%, B 0.57 wt%, Ti 0.51 wt%.

POLYMERIZATION

Copolymerization of ethylene and hexene was conducted exactly as in Example 3. The yield of copolymer was 139.04 g. The MI of the polymer was 0.08 dg/min and the HLMI was 6.69 dg/min. The MIR was 86.9 indicating a broad molecular weight distribution

EXAMPLE 6

Silica gel (3 g, Davison SD 293, dehydrated at 700° C.) was charged to a 125 Wheaton vial in a dry box. To this was added 40 ml heptane and 5.4 mmoles butyl ethyl magnesium. The slurry was stirred for 30 minutes. The vial was then charged with 1.5 mmoles Hf(OR)$_2$Cl$_2$ (R=2-ethyl hexyl) and agitated at ambient temperature for one hour. To this slurry was then added 0.9 mmoles BCl$_3$ followed by agitation for 15 minutes. Finally, 0.9 mmoles TiCl$_4$ was added to the slurry and the temperature increased to 85° C. and held at this temperature for 15 minutes. The solid was washed four times with hexane and dried. Yield of solid catalyst was 4.630 g. Metals analysis of the solid gave the following results: Mg 2.18 wt%, Hf 5.33 wt%, B 0.18 wt%, Ti 0.94 wt%.

POLYMERIZATION

Copolymerization of ethylene and hexene was conducted exactly as in Example 3. The yield of copolymer was 92.8 g. The MI of the resin was 0.09 dg min and the HLMI was 5.62 dg min giving an MIR equal to 63.9. The density of the resin was 0.9382 g/cc.

The invention claimed is:

1. A supported olefin polymerization catalyst prepared under anhydrous conditions by the steps of:
(1) sequentially
   (a) preparing a slurry of inert particulate support material,
   (b) adding to said slurry a solution of an organomagnesium compound,
   (c) adding to said slurry and reacting a solution of hafnium compound, and
(2) thereafter
   (d) adding to said slurry and reacting a halogenator,
   (e) adding to said lsurry and reacting a tetravalent titanium compound and
   (f) recovering solid catalyst.

2. The catalyst component according to claim 1 wherein said inert particulate support material is dehydrated high surface area silica.

3. The catalyst according to claim 2 wherein said silica has from about 1.00 to 1.50 millimoles OH$^-$/gram of silica.

4. The catalyst according to claim 1 wherein said organomagnesium compound is a dihydrocarbylamgnesium compound.

5. The catalyst according to claim 4 wherein said dihydrocarbyl is dialkyl.

6. The catalyst according to claim 4 wherein said dihydrocarbyl is diaryl.

7. The catalyst according to claim 4 wherein said organomagnesium compound is n-butyl-sec-butyl magnesium, diisopropyl magnesium, di-n-hexyl magnesium, isopropyl-n-butyl magnesium, ethyl-n-hexyl magnesium, ethyl-n-butyl magnesium, di-n-octyl magnesium or mixtures thereof.

8. The catalyst according to claim 4 wherein said organomagnesium compound is diphenylmagnesium, dibenzylmagnesium, ditolylmagnesium or mixtures thereof.

9. The catalyst according to claim 2 wherein said organomagnesium compound is ethyl-n-butyl magnesium.

10. The catalyst according to claim 1 wherein said hafnium compound is a halide alkoxyhalide, alkoxide, chelate or mixture thereof.

11. The catalyst according to claim 10 wherein said hafnium compound is represented by the empirical formula Hf(OR)$_x$X$_y$, wherein R is independently a hydrocarbyl group having from 1 to about 20 carbon atoms, each X is independently chlorine or bromine, and x and y independently have values from zero to 4 with the value of x plus y being 4.

12. The catalyst according to claim 9 wherein said hafnium compound is di(2-ethyl hexoxy)dichlorohafnium.

13. The catalyst according to claim 1 wherein said halogenator is a chloride, bromide or fluoride of a metal from Group 3a, 4a, or 5a of the Periodic Table of Elements or mixtures thereof.

14. The catalyst according to claim 13 wherein said metal is B, Si, Ge, Sn, P, Sb or Bi or mixtures thereof.

15. The catalyst according to claim 14 wherein said halogenator is a chloride.

16. The catalyst according to claim 15 wherein said metal is B.

17. The catalyst according to claim 12 wherein said halogenator is BCl$_3$.

18. The catalyst according to claim 1 wherein said tetravalent titanium compound is a halide, alkoxyhalide, alkoxide, siloxyhalide, siloxide, aromatic ring complex, chelate or mixture thereof.

19. The catalyst according to claim 17 wherein said tetravalent titanium compound is TiCl$_4$.

20. The catalyst according to claim 1 wherein the atomic ratio of Mg:Hf is from about 1:1 to about 14:1 and of Hf to Ti is from about 0.2:1 to about 10:1.

* * * * *